J. C. CLARKSON.
CHAIN LOCK.
APPLICATION FILED JAN. 3, 1918.
1,280,163.
Patented Oct. 1, 1918.
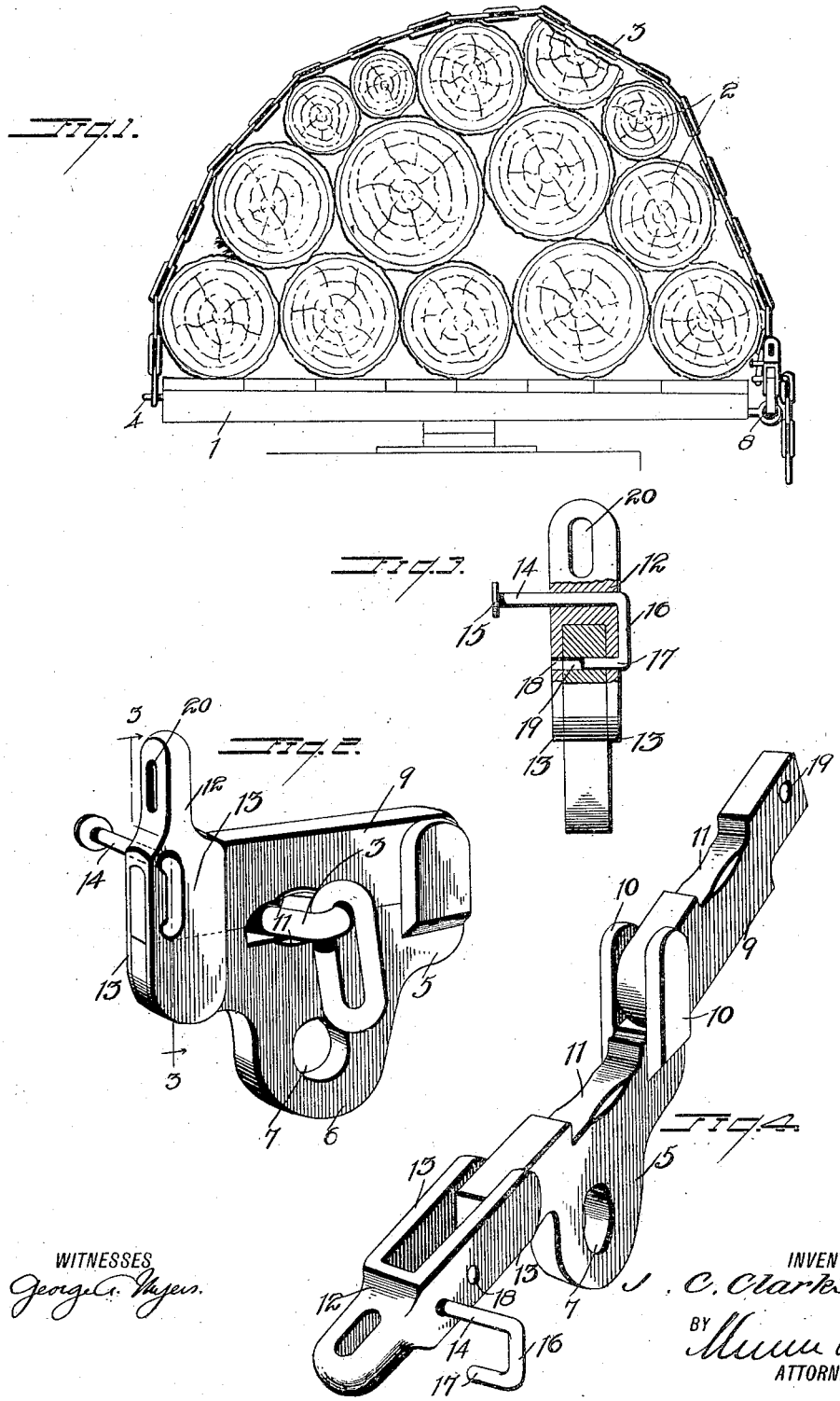

UNITED STATES PATENT OFFICE.

JAY CALEB CLARKSON, OF FOSTORIA, TEXAS, ASSIGNOR OF ONE-HALF TO EBBIE CULLEN SMITH, OF FOSTORIA, TEXAS.

CHAIN-LOCK.

1,280,163.  Specification of Letters Patent.  Patented Oct. 1, 1918.

Application filed January 3, 1918. Serial No. 210,187.

*To all whom it may concern:*

Be it known that I, JAY C. CLARKSON, a citizen of the United States, and a resident of Fostoria, in the county of Montgomery and State of Texas, have invented certain new and useful Improvements in Chain-Locks, of which the following is a specification.

My invention is an improvement in chain locks, and has for its object to provide a device of the character specified, especially adapted for locking one end of a log chain to a car, in such manner that the chain cannot become accidentally released, through shock or jar, but which may be easily released, when desired, from a distance, to prevent injury to the operator.

In the drawings:

Figure 1 is a diagrammatic end view of a load of logs showing the lock in use;

Fig. 2 is a perspective view of the lock closed;

Fig. 3 is a section on the line 3—3 of Fig. 2, looking in the direction of the arrows adjacent the line;

Fig. 4 is a perspective view of the lock open.

The present embodiment of the invention is shown in connection with a car 1 having a load of logs 2, and the lock connects one end of a chain 3 with the car, the other end of the chain being connected to the opposite side of the car, as indicated at 4.

The lock comprises a bar 5 having intermediate its ends a depending lug 6 provided with an opening 7 for engaging an eye bolt 8 or the like to hold the bar to the car. A second bar 9 is hinged to the bar 5 at one end, the bar 5 having upstanding lugs 10 between which the bar 9 is pivoted.

The bar 9 is adapted to hinge down upon the bar 5, as shown in Fig. 2, and the said bars 5 and 9 are recessed on their adjacent faces, as indicated at 11, to receive a link of the chain, the said link lying flat within the coöperating recesses, as shown in Fig. 2.

Latch mechanism is provided for holding the free end of the bar 9 to the bar 5. The said mechanism comprises a yoke consisting of a body 12 and arms 13, the said arms being received on opposite sides of the bar 5 at the end remote from the lugs 10 and being pivoted thereto, to permit the yoke to swing into the position of Fig. 2 or into that of Fig. 4. A pin 14 is mounted to slide transversely of the body of the yoke in an opening provided for the purpose, and the said pin at the end remote from the head 15 has an angular portion 16 provided with a locking lug 17 at its free end, the lug 17 extending approximately parallel with the body of the pin in spaced relation. The arms 13 of the yoke and bar 9 have openings 18 and 19, respectively, which are adapted to register when the bars are superposed in the position shown in Fig. 2, to receive the locking lug 17 of the pin.

It will be noticed that the body 12 of the yoke has an eye 20, which is adapted to be engaged by a hook on a rope to release the lock.

In use, the lock may be permanently connected to the car. When it is desired to lock the chain, the chain is placed in the recesses 11 as tightly as desired. The coöperating recesses 11 are of a depth to receive a link and to permit the link to move freely in the recesses, but they are not of a depth to permit the passage of the joint between two links, that is, to permit the entrance of the succeeding link. Hence the engagement of the succeeding link prevents displacement of the chain.

When the bar 9 is swung down upon the bar 5 the yoke is swung up into the position of Fig. 2, after which the locking lug 17 of the pin is engaged with the registering openings 18—19. When it is desired to release the lock, the hook of the rope is engaged with the eye 20, after which the pin is moved to release the lug 17. Standing at a distance, the operator now pulls on the rope, swinging the yoke into the position of Fig. 4 and releasing the bar 9. Thus the lock may be released at a distance such that there is no possibility of injury to the operator.

I claim:

1. A device of the character specified, comprising a pair of bars hingedly connected at one end, one of the bars having an outwardly extending lug intermediate its ends provided with an opening for connecting the lock to a car, a yoke comprising a body and arms, the arms being hinged to the other end of the said bar and adapted to swing over the adjacent end of the other bar in the plane of the bars to hold the bars together at the said end, and means for locking the yoke to the last named bar, said bars having coöperating recesses on their meeting edges for receiving the link of a chain, the locking means for the yoke comprising a pin slidable transversely of the body of the yoke and having a locking lug offset laterally from the pin and parallel therewith, said yoke, arms and the last named bar having openings adapted to register when the bar is closed to lock the yoke, and the yoke having an eye on its body for engagement by releasing means.

2. A device of the character specified, comprising a pair of bars hingedly connected at one end, one of the bars having an outwardly extending lug intermediate its ends provided with an opening for connecting the lock to a car, a yoke comprising a body and arms, the arms being hinged to the other end of the said bar and adapted to swing over the adjacent end of the other bar to hold the bars together at the said end, and means for locking the yoke to the last named bar, said bars having coöperating recesses on their meeting edges for receiving the link of a chain, the locking means for the yoke comprising a pin slidable transversely of the body of the yoke and having a locking lug offset laterally from the pin and parallel therewith, said yoke, arms and the last named bar having openings adapted to register when the bar is closed to lock the yoke.

3. A device of the character specified, comprising a pair of bars hingedly connected at one end, one of the bars having an outwardly extending lug intermediate its ends provided with an opening for connecting the lock to a car, a yoke comprising a body and arms, the arms being hinged to the other end of the said bar and adapted to swing over the adjacent end of the other bar in the plane of the bars to hold the bars together at the said end, and means for locking the yoke to the last named bar.

4. A device of the character specified, comprising a pair of bars hinged together at one end and having coöperating recesses on their meeting edges to receive the link of a chain, a yoke connected to the free end of one of the bars and adapted to engage over the end of the other bar to hold them together, said yoke comprising a body and arms, the arms being pivoted to the said bar on an axis transverse to the bar, for the purpose specified.

JAY CALEB CLARKSON.

Witnesses:
J. L. JENNINGS,
W. L. CONNELL.

Copies of this patent may be obtained for five cents each, by addressing the "Commissioner of Patents, Washington, D. C."